United States Patent
Thomassin et al.

(10) Patent No.: US 10,118,695 B2
(45) Date of Patent: Nov. 6, 2018

(54) DIRECTIONAL CONTROL SYSTEM AND METHOD OF PROVIDING DIRECTIONAL CONTROL

(71) Applicant: Pratt & Whitney Canada Corp., Longueuil (CA)

(72) Inventors: Jean Thomassin, Ste-Julie (CA); Serge Dussault, St-Bruno (CA); Andre Julien, Ste-Julie (CA); Gordon Saby, St-Bruno (CA); Richard Ullyott, St-Bruno (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 294 days.

(21) Appl. No.: 15/074,454

(22) Filed: Mar. 18, 2016

(65) Prior Publication Data

US 2017/0267341 A1    Sep. 21, 2017

(51) Int. Cl.
| | |
|---|---|
| B64C 27/82 | (2006.01) |
| B64C 21/04 | (2006.01) |
| B64C 27/12 | (2006.01) |
| B64D 33/04 | (2006.01) |
| B64D 33/02 | (2006.01) |

(52) U.S. Cl.
CPC ............ *B64C 27/82* (2013.01); *B64C 21/04* (2013.01); *B64C 27/12* (2013.01); *B64D 33/02* (2013.01); *B64D 33/04* (2013.01); *B64C 2027/8245* (2013.01); *B64D 2033/024* (2013.01)

(58) Field of Classification Search
CPC . B64C 2027/8245; B64C 21/04; B64C 27/12; B64C 27/82; B64D 33/02; B64D 33/04
See application file for complete search history.

(56) References Cited

U.S. PATENT DOCUMENTS

| | | | |
|---|---|---|---|
| 4,830,312 A * | 5/1989 | Hain | B64D 33/08 244/17.11 |
| 6,698,687 B2 | 3/2004 | Daggett | |
| 7,611,093 B2 | 11/2009 | Campbell et al. | |
| 7,721,988 B2 | 5/2010 | Schiebel | |
| 2010/0326049 A1 | 12/2010 | Schmittenberg et al. | |
| 2011/0139924 A1* | 6/2011 | Nakayama | B64C 27/22 244/17.21 |

(Continued)

FOREIGN PATENT DOCUMENTS

| | | |
|---|---|---|
| WO | 20140197488 | 12/2014 |
| WO | 20150042514 | 3/2015 |

*Primary Examiner* — Justin M Benedik
(74) *Attorney, Agent, or Firm* — Norton Rose Fulbright Canada LLP

(57) ABSTRACT

A directional control system for a rotorcraft having a tail boom including a no-tail-rotor apparatus configured to control rotorcraft yaw using forced air ejected from the tail boom and a duct configured to deliver the forced air to the no-tail-rotor apparatus. The directional control system comprises a heat exchanger having air passages and fluid passages, the air passages in fluid communication with the duct, the fluid passages in heat exchange relationship with the air passages and configured for receiving a cooling fluid, and a forced air driver in fluid communication with the duct for driving the forced air through the duct to the no-tail-rotor apparatus. Methods of providing directional control in a rotorcraft are also discussed.

20 Claims, 6 Drawing Sheets

(56) References Cited

U.S. PATENT DOCUMENTS

| | | | | |
|---|---|---|---|---|
| 2012/0119017 A1* | 5/2012 | Robertson | ............... | B64C 3/54 |
| | | | | 244/12.5 |
| 2012/0312916 A1* | 12/2012 | Groninga | ............... | B64C 27/82 |
| | | | | 244/17.19 |
| 2012/0318910 A1* | 12/2012 | Smith | ............... | B64C 27/82 |
| | | | | 244/52 |
| 2012/0318911 A1* | 12/2012 | Robertson | ............... | B64C 27/82 |
| | | | | 244/52 |
| 2013/0119186 A1* | 5/2013 | Heid | ............... | B64C 27/82 |
| | | | | 244/17.21 |

* cited by examiner

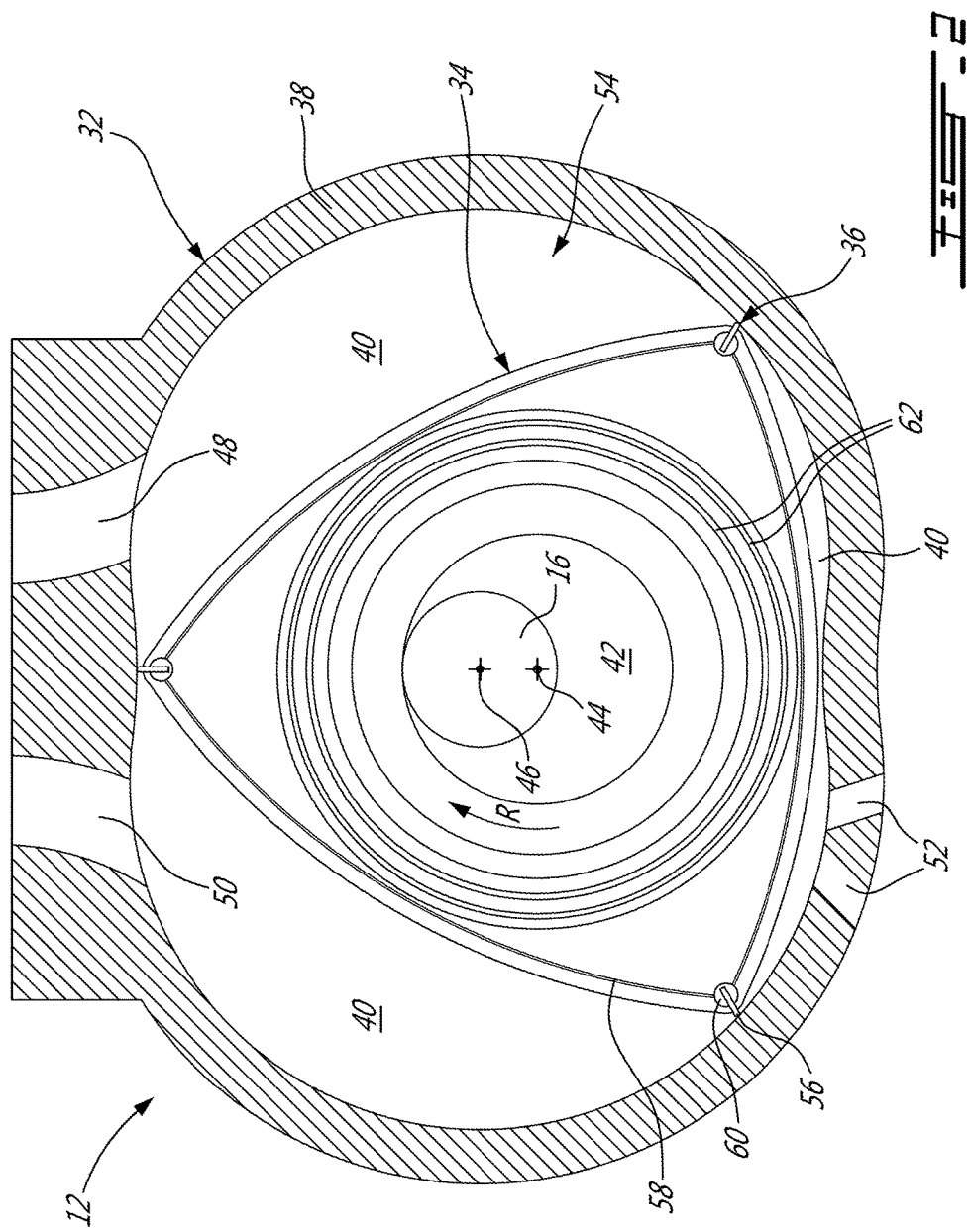

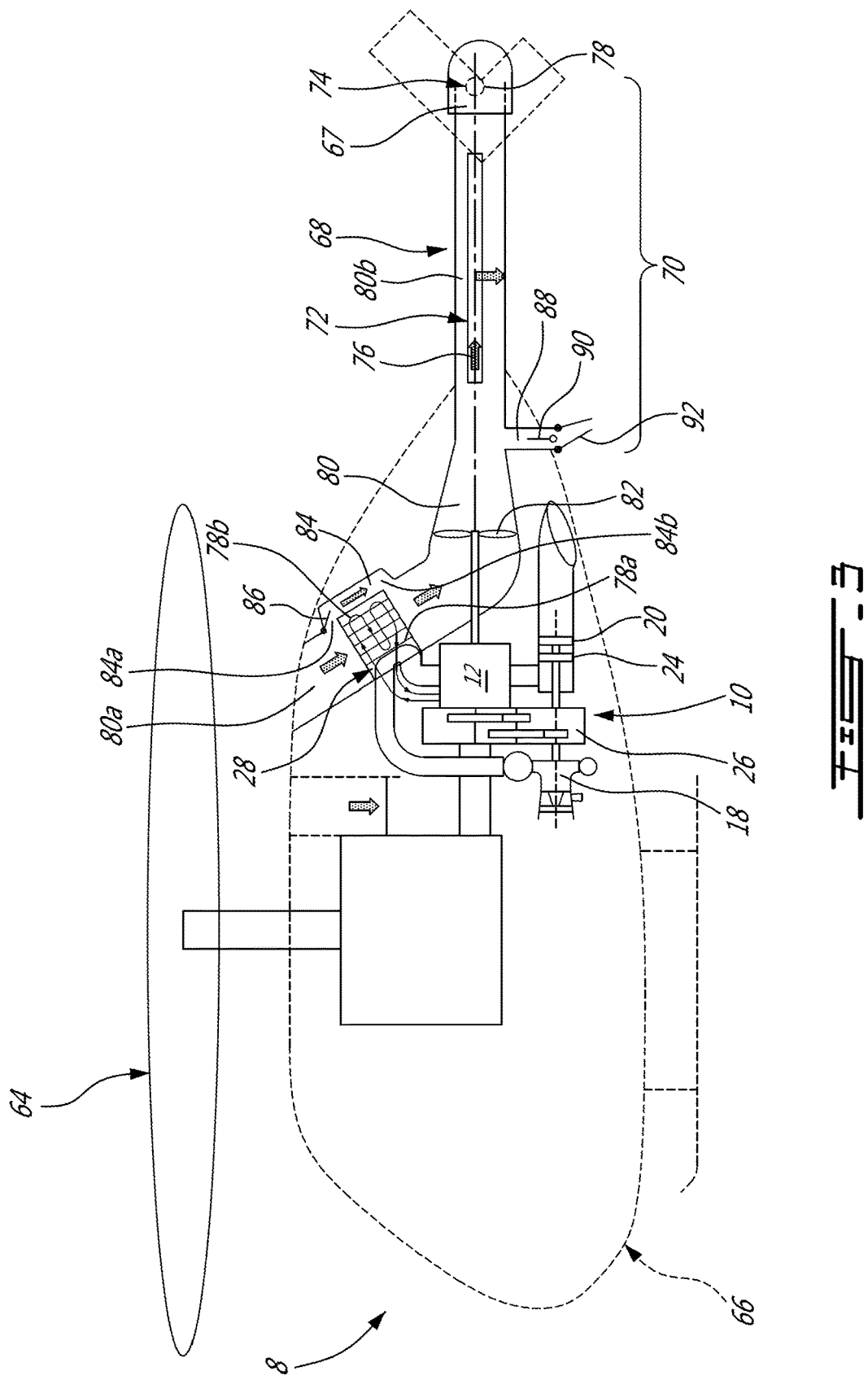

DIRECTIONAL CONTROL SYSTEM AND METHOD OF PROVIDING DIRECTIONAL CONTROL

TECHNICAL FIELD

The application relates generally to directional control in rotorcraft and, more particularly, to directional control in rotorcraft without tail rotors.

BACKGROUND OF THE ART

Some rotorcraft use a directional system based on directing airflow around and out of the tail boom in replacement of the tail rotor, in a configuration generally known as NOTAR® (NO TAil Rotor). Such directional systems require a relatively high volume air flow which is typically generated by a fan driven from the transmission of the main rotor. In flight conditions with lower directional flow requirements, the excess airflow may be exhausted back to the environment in a direction which is not prejudicial to the flight handling of the rotorcraft.

Aircraft engine assemblies generally include heat exchanger(s) to cool used cooling fluids. The cooling airflow circulated through such heat exchangers is typically taken from the environment of the engine assembly and exhausted back to the environment after circulation through the heat exchanger(s).

SUMMARY

In one aspect, there is provided a directional control system for a rotorcraft having a main rotor and a tail boom, the tail boom including a no-tail-rotor apparatus configured to control rotorcraft yaw using forced air ejected from the tail boom and a duct configured to deliver the forced air to the no-tail-rotor apparatus, the directional control system comprising: a heat exchanger having air passages and fluid passages, the air passages in fluid communication with the duct, the fluid passages in heat exchange relationship with the air passages and configured for receiving a cooling fluid; and a forced air driver in fluid communication with the duct for driving the forced air through the duct to the no-tail-rotor apparatus.

In another aspect, there is provided a method of providing directional control in a rotorcraft having a main rotor and a tail boom, the method comprising: cooling a component of the rotorcraft with a liquid coolant; cooling the liquid coolant from the component in a heat exchanger by circulating a cooling airflow through the heat exchanger in heat exchange relationship with the liquid coolant; and circulating the cooling airflow from the heat exchanger through the tail boom and out of the tail boom, including creating a boundary layer flow along an outer surface of the tail boom with the cooling airflow, and directing a downwash from the main rotor around the tail boom with the boundary layer flow to produce a thrust opposite a torque from the main rotor.

In a further aspect, there is provided a method of providing directional control in a rotorcraft having a main rotor and a tail boom, the method comprising: creating a flow of air from an environment of the rotorcraft into the tail boom, at least part of the air circulating in heat exchange relationship with a cooling fluid of the rotorcraft before reaching the tail boom; and circulating air out of the tail boom through a thruster positionable to discharge the air along a selected one of opposed sides of the tail boom, including orienting the thruster to create a predetermined yaw moment on the rotorcraft with the air discharged therefrom.

DESCRIPTION OF THE DRAWINGS

Reference is now made to the accompanying figures in which:

FIG. 2 is a schematic cross-sectional view of a Wankel engine which can be used in a compound engine assembly such as shown in FIG. 1, according to a particular embodiment;

FIG. 3 is a schematic cross-sectional view of a rotorcraft incorporating a compound engine assembly such as shown in FIG. 1, used in combination with an directional control system according to a particular embodiment;

DETAILED DESCRIPTION

Figure 1:
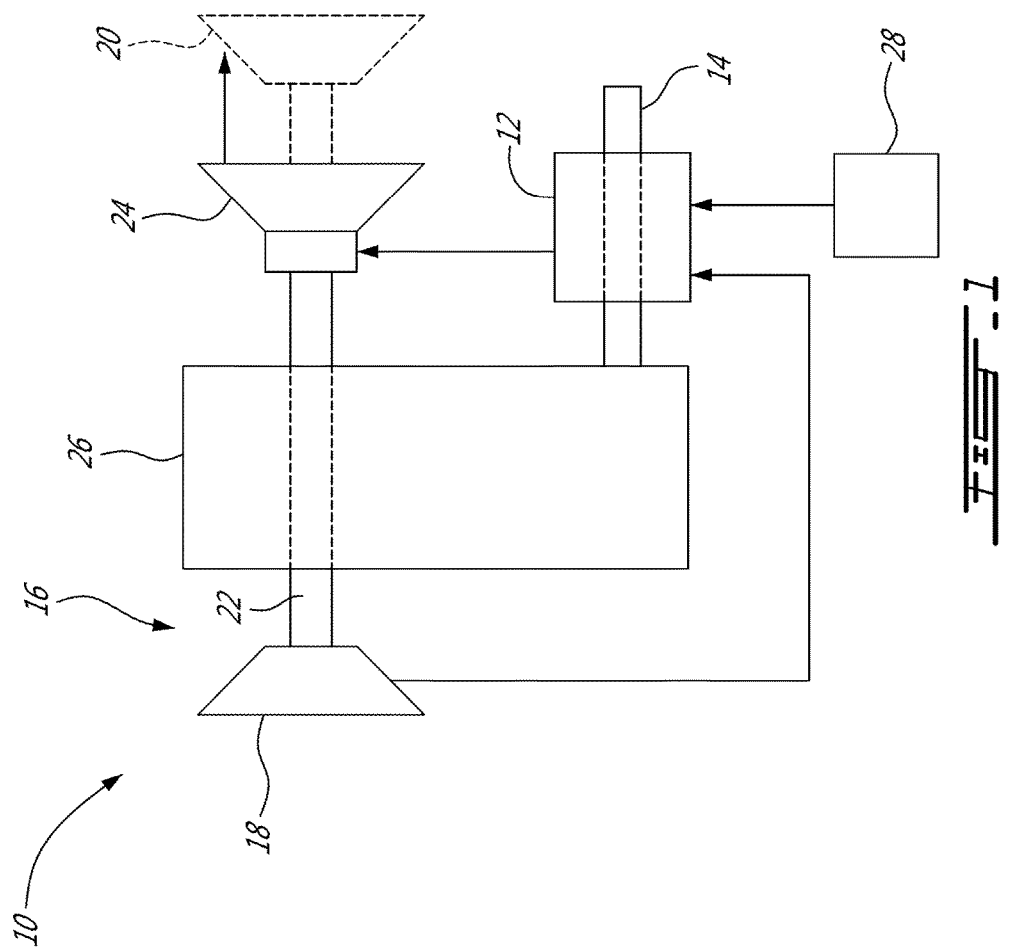
FIG. 1 is a schematic representation of a compound engine assembly according to a particular embodiment.

Referring to FIG. 1, a compound engine assembly 10 is schematically shown. The engine assembly 10 includes an engine core 12 with one or more intermittent combustion internal combustion engine(s). The internal combustion engine(s) of the core 12 drive a common load. In the embodiment shown, the common load includes an output shaft 14 which may be for example connected to a propeller through a reduction gearbox (not shown) and to which each internal combustion engine is engaged. Other possible common loads may include, but are not limited to, one or more compressor and/or fan rotor(s), electrical generator(s), accessories, rotor mast(s), or any other type of load or combination thereof. Accordingly, the engine assembly 10 may be used for example as a turboshaft engine, a turboprop engine, or an auxiliary power unit (APU).

In the embodiment shown, the engine assembly 10 also includes a turbocharger 16, including a compressor 18 and a second stage turbine 20 which are drivingly interconnected by a shaft 22. The compressor 18 and the second stage turbine 20 may each be a single-stage device or a multiple-stage device with a single shaft or split on multiple independent shafts in parallel or in series, and may each be a centrifugal or axial device. The compressor 18 of the turbocharger 16 compresses the air before it enters the engine(s) of the engine core 12. The compressor 18 and the second stage turbine 20 may each include one or more rotors, with radial, axial or mixed flow blades.

In the embodiment shown, the shaft 22 of the turbocharger 16 extends along a different axis than that of the output shaft 14, for example parallel thereto; alternately, the shaft 22 of the turbocharger may extend transverse to the output shaft 14, or may be defined coaxially with the output shaft 14. The turbocharger shaft 22 and output shaft 14 are in driving engagement with one another, through any suitable type of transmission or gearbox 26, for example a planetary, star, offset or angular gear system.

Each internal combustion engine provides an exhaust flow in the form of exhaust pulses. The exhaust flow of each internal combustion engine of the core 12 is supplied to a compound or first stage turbine 24 in fluid communication therewith. The first stage turbine 24 could be an axial, radial or mixed flow turbine. In the embodiment shown, the first stage turbine 24 is drivingly interconnected to the second stage turbine 20 by being mounted to the same turbine shaft 22, and accordingly also drivingly engaged to the output shaft 14 through the gearbox 26. In an alternate embodiment, the turbines 24, 20 may rotate independently, with the first stage turbine 24 drivingly engaged to the output shaft 14, for example via the gearbox 26, and the second stage turbine 26 drivingly engaged to the compressor 18, for example via the turbine shaft 22.

The outlet of the first stage turbine 24 is in fluid communication with an inlet of the second stage turbine 20. Energy is extracted from the exhaust gas exiting the first stage turbine 24 by the second stage turbine 20 to drive the compressor 18 via the connecting shaft 22. In a particular embodiment, the second stage turbine 20 has a higher reaction ratio than the first stage turbine 24.

It is understood that the particular configuration for the engine assembly 10 shown is provided as an example only, and that the configuration may vary; various possible configurations include, but are not limited to, more or less turbines, the compressor being omitted, and/or the engine core and turbine(s) rotating independently from one another (i.e. not compounded).

The fuel injector(s) of each engine of the core 12, which in a particular embodiment are common rail fuel injectors, communicate with a source of heavy fuel (e.g. diesel, kerosene (jet fuel), equivalent biofuel), and deliver the heavy fuel into the engine(s) of the core 12 such that the combustion chamber is stratified with a rich fuel-air mixture near the ignition source and a leaner mixture elsewhere.

Although not shown in FIG. 1, the air may circulate through an intercooler between the compressor 20 and the engine core 12. The engine assembly 10 also includes a cooling system including a heat exchanger 28 (see also FIG. 3) to cool a cooling fluid circulating through the engine core 12. In a particular embodiment, the cooling fluid is an appropriate liquid coolant, for example water. The airflow through the heat exchanger of the engine assembly 10 is used for directional control, as will be further detailed below.

In a particular embodiment, the engine core 12 includes two (2) core engines, each being a rotary internal combustion engine having a rotor sealingly engaged in a respective housing, for example a Wankel rotary engine. Referring to FIG. 2, an exemplary embodiment of a Wankel engine forming part of the engine core 12 is shown; it is understood that the configuration of the core engine(s) used in the engine assembly 10, e.g. placement of ports, number and placement of seals, etc., may vary from that of the embodiment shown. In addition, it is understood that each core engine may be any other type of internal combustion engine including, but not limited to, any other type of rotary engine, and any other type of internal combustion engine (e.g. reciprocating engine). More or less core engines may be provided; as non-limiting examples, in other particular embodiments, the engine core includes a single Wankel engine, or four (4) Wankel engines, or any suitable number of intermittent internal combustion engines having any other suitable configuration (e.g. reciprocating engine).

As shown in FIG. 2, each Wankel engine comprises a housing 32 defining an internal cavity with a profile defining two lobes, which is preferably an epitrochoid. A rotor 34 is received within the internal cavity. The rotor defines three circumferentially-spaced apex portions 36, and a generally triangular profile with outwardly arched sides. The apex portions 36 are in sealing engagement with the inner surface of a peripheral wall 38 of the housing 32 to form three working chambers 40 between the rotor 34 and the housing 32.

The rotor 34 is engaged to an eccentric portion 42 of the output shaft 16 to perform orbital revolutions within the internal cavity. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the internal cavity to undergo the four phases of intake, compression, expansion and exhaust.

An intake port 48 is provided through the peripheral wall 38 for successively admitting compressed air from the inlet manifold 18 into each working chamber 40. An exhaust port 50 is also provided through the peripheral wall 38 for successively discharging the exhaust gases from each working chamber 40. Passages 52 for a glow plug, spark plug or other ignition element, as well as for one or more fuel injectors (not shown) are also provided through the peripheral wall 38. Alternately, the intake port 48, the exhaust port 50 and/or the passages 52 may be provided through an end or side wall 54 of the housing; and/or, the ignition element and a pilot fuel injector may communicate with a pilot subchamber (not shown) defined in the housing 32 and communicating with the internal cavity for providing a pilot injection. The pilot subchamber may be for example defined in an insert (not shown) received in the peripheral wall 38.

For efficient operation the working chambers 40 are sealed, for example by spring-loaded apex seals 56 extending from the rotor 34 to engage the peripheral wall 38, and spring-loaded face or gas seals 58 and end or corner seals 60 extending from the rotor 34 to engage the end walls 54. The rotor 34 also includes at least one spring-loaded oil seal ring 62 biased against the end wall 54 around the bearing for the rotor 34 on the shaft eccentric portion 42.

Each Wankel engine provides an exhaust flow in the form of a relatively long exhaust pulse; for example, in a particular embodiment, each Wankel engine has one explosion per 360° of rotation of the output shaft, with the exhaust port remaining open for about 270° of that rotation.

In a particular embodiment which may be particularly but not exclusively suitable for low altitude, each Wankel engine has a volumetric expansion ratio of from 5 to 9, and a volumetric compression ratio lower than the volumetric expansion ratio. The power recovery of the first stage turbine 26 may be maximized by having the exhaust gas temperatures at the material limit, and as such is suitable for such relatively low volumetric compression ratios, which may help increase the power density of the Wankel engine and may also improve combustion at high speed and of heavy fuel.

Referring to FIG. 3 and as mentioned above, in the embodiment shown the airflow through the heat exchanger 28 of the engine assembly 10 is used in a directional control system 70 for a rotorcraft 8 of the NOTAR® type, i.e. a rotorcraft where the torque produced by the main rotor 64 is countered without the need for an exposed tail rotor. The absence of tail rotor may allow for increased safety and foreign object damage tolerance and/or reduced noise signature.

The rotorcraft 8 generally includes a fuselage 66, a tail boom 68 extending from the fuselage 66, and the main rotor 64 providing lift and some directional control on the rotorcraft. The tail boom 68 includes a directional control system 70 which includes any appropriate type of no-tail-rotor apparatus configured as a forced air system controlling rotorcraft yaw using forced air ejected from the tail boom 68. In the embodiment shown, the no-tail-rotor apparatus includes an anti-torque control system 72 to counteract the torque generated by the main rotor 64, and a yaw control system 74 to generate a yaw moment to direct the rotorcraft 8 as required during flight.

In the embodiment shown, the anti-torque control system 72 includes one or more nozzle(s) 76 having a linear configuration and extending longitudinally along an outer surface of the tail boom 68; in a particular embodiment, two nozzles 76 are provided, each defined by a respective longitudinal, elongated slot formed through the wall of the tail boom 68. Anti-torque thrust on the tail boom 68 is generated using the Coandă effect. Air expelled through the nozzle(s) 76 is directed tangentially along the outer surface of the tail boom 68 and creates a boundary layer flow along the tail boom 68. The boundary layer changes the direction of the main rotor downwash around the tail boom 68, creating a thrust opposite the torque created by the main rotor 64.

In the embodiment shown, the yaw control system 74 includes a jet thruster 78 provided on the distal end 67 of the tail boom 68. The thruster 78 is positionable to be directed laterally with respect to the tail boom 68 in a selected one of a plurality of different orientations. In the embodiment shown, the thruster 68 is also positionable to be directed completely aft, to provide forward thrust. Thrust generated by the thruster 78 may be modulated by varying its exit area or changing the direction of its thrust vector.

Depending on the flight conditions, the anti-torque thrust for counteracting the torque generated by the main rotor 64 may be provided by the anti-torque control system 72 and the yaw control system 74, which both act as lateral force-producing elements. For example, in a particular embodiment and in hover, approximately 50% of the anti-torque thrust is produced by the anti-torque control system 72 and approximately 50% of the anti-torque thrust is produced by the yaw control system 74. As forward speed increases from a hover, the vertical tail surfaces provide an increasing amount of anti-torque thrust. At higher speeds, for example above 50 to 60 knots, almost all of the anti-torque force comes from the anti-torque control system 72, and the yaw control system 74 is used to direct/turn the rotorcraft 8 as required.

The directional control system 70 includes a duct 80 having an upstream end 80a in fluid communication with an environment of the rotorcraft 8 and a downstream end 80b in fluid communication with the no-tail-rotor apparatus; in the embodiment shown, the downstream end 80b is in communication with each nozzle 76 and with the thruster 78. Flow to each nozzle 76 and thruster 78 is provided through this duct 80.

The heat exchanger 28 has air passages 78a in fluid communication with the duct 80 and fluid passages 78b in heat exchange relationship with the air passages 78a; in the embodiment shown, the heat exchanger 28 is received within the duct 80, upstream of each nozzle 72 and thruster 74. The fluid passages 78b receive a cooling fluid. In the embodiment shown, the fluid passages 78b receive the used cooling fluid (e.g. liquid coolant such as water) after its circulation in cooling passages defined through the housing 32 of the rotary internal combustion engine(s) of the engine core 12.

In the embodiment shown, the heat exchanger 28 also includes a section acting as an intercooler through which the air from the compressor 20 circulates before reaching the engine core 12. Alternately, the intercooler may be provided separate from the heat exchanger 28 within the duct 80, or be omitted.

The duct 80 combines the airflow required for cooling the cooling fluid of the engine core 12 in the heat exchanger 28 and the airflow required for the directional control system 70. A forced air driver, which in the embodiment shown is a rotatable fan 82, is in fluid communication with the duct 80 for driving the airflow through the duct 80 and thus through the heat exchanger 28 and to each nozzle 76 and thruster 78. In the embodiment shown, the fan 82 is received within the duct 80; other locations are also possible. It is understood that any other suitable mechanism for forcing a flow of air through the duct 80 may alternately be used, including, but not limited to, one or more ejector(s). The forced air drawn by the fan 82 thus passes through the heat exchanger 28 to provide engine cooling, and the exhaust from the heat exchanger 28 is used in the no-tail-rotor apparatus of the directional control system 70. The heat exchanger 28 may be positioned upstream or downstream of the fan 82, as is convenient for a particular installation.

In a particular embodiment, the fan 82 is a variable pitch fan to be able to modulate the flow; for example, in forward flight, the fan pitch can be set to produce a minimum flow to minimize power consumption. The fan 82 is configured to provide a high volume, low pressure flow of air to the nozzle(s) 76 and thruster 78. In the embodiment shown, the fan 82 is driven by the engine core 12 through driving engagement with the rotary engine(s). The pitch of the fan 82 is controlled by a system controller, which takes into account the cooling demand on the engine core 12 (e.g. power level) and the rotorcraft directional control demand such that the demands may be simultaneously met while minimizing the shaft power extracted from the engine core 12.

The sizing of the fan 82 is thus driven by the largest between the flow requirement of the heat exchanger 28 and the flow requirement of the directional control system 70. In cases where the flow requirement of the directional control system 70 is largest, a bypass passage 84 may be provided, having one end 84a communicating with the duct 80 upstream of the heat exchanger 28 and an opposed end 84b communicating with the duct 80 downstream of the heat exchanger 28, such that part of the flow may bypass the heat exchanger 28, as required. A valve 86 may be provided in the bypass passage 84 to modulate the flow therethrough.

Conversely, if the flow requirements of the heat exchanger 28 is largest, the excess flow may be dumped overboard in a direction that is beneficial (or not prejudicial) to the flight handling of the rotorcraft 8. For example, an exhaust conduit 88 may be provided in communication with the duct 80 downstream of the heat exchanger 28 and upstream of each nozzle 76 and thruster 78. A valve 90 may be provided in the exhaust conduit 88 to modulate the flow therethrough. The exhaust conduit 88 is illustrated directing the flow in a downward direction to assist the lift of the rotorcraft 8; other directions may also be possible. The exhaust conduit optionally includes a thrust vectoring feature to provide thrust to assist with propulsion of the rotorcraft 8. The vectoring feature could be for example a gimballing nozzle or a modulating door opening aft 92 as shown. Other configurations may also be used.

In cases where the rotorcraft 8 is alternately used both in conditions where the flow requirement of the directional control system is larger and in conditions where the flow requirement of the cooling system is larger, the valve(s) 86, 90 is/are used to modulate the proportion of flow through the heat exchanger 28 and to the directional control system 70.

For example, in a particular embodiment, the heat rejection from the heat exchanger 28 is roughly proportional to the power of the engine assembly 10 during hover. For a constant speed of the main rotor 64, the torque reaction is also proportional to the power of the engine assembly 10; the flow requirements for the heat exchanger 28 and for the directional control system 70 may thus vary in parallel and be managed without requiring modulation of the proportion of flow between the two. Short term transient conditions for the directional control system 70, for example to turn the rotorcraft 8, may fall within the transient capabilities of the heat exchanger 28, thus avoiding the need to modulate the proportion of flow during these conditions. However, in high speed forward flight and climb forward flight, the flow requirement for the directional control system 70 is relatively low since anti-torque is provided by conventional aerodynamic vertical stabilizers, while the flow requirement for the heat exchanger 28 is relatively high as the rotorcraft 8 approaches maximum speed and the engine core 12 runs near maximum continuous power. In this situation, the valve 90 of the exhaust conduit 88 is opened to allow the excess cooling flow to be vented before reaching the directional control system 70, while the valve 86 of the bypass passage 84 is closed. In contrast, at low forward speeds, in sustained turns and sustained descent, the flow requirement for the directional control system 70 may exceed the flow requirement for the heat exchanger 28. In this situation, the valve 86 of the bypass passage 84 is opened such that part of the airflow bypasses the heat exchanger 28, while the valve 90 of the exhaust conduit 88 is closed.

Alternately, the bypass passage 84 may be replaced by a liquid side bypass on the heat exchanger 28, a thermostatic valve, or any other feature providing for the bypass in heat exchange. However, in a particular embodiment, the bypass passage 84 provides for lower losses and/or higher performance capability for the directional control system 70 than a liquid side bypass.

Referring to FIGS. 4 to 7C, the thruster 78 and its components according to a particular embodiment are shown. It is understood that the thruster 78 may alternately have any other suitable configuration.

In this embodiment, the thruster 78 is configured such that when the flow requirement for the directional control system 70 is lower than the flow requirement for the heat exchanger 28, for example at high forward speed, the excess air flow may be used for additional forward thrust as required instead of being vented through the exhaust conduit 88, which may be omitted. The thruster 78 is thus configured to provide an axial thrust vector so as to assist propulsion.

Figure 4:
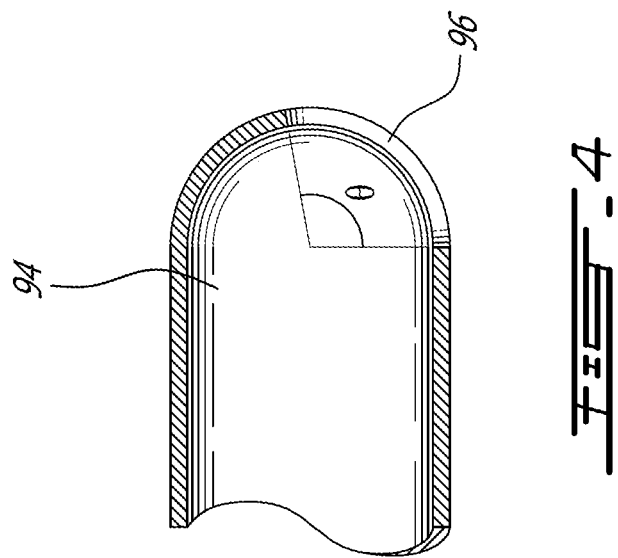
FIG. 4 is a schematic cross-sectional view of an end portion of a tail boom of the rotorcraft of FIG. 3, according to a particular embodiment.
Figure 6A:
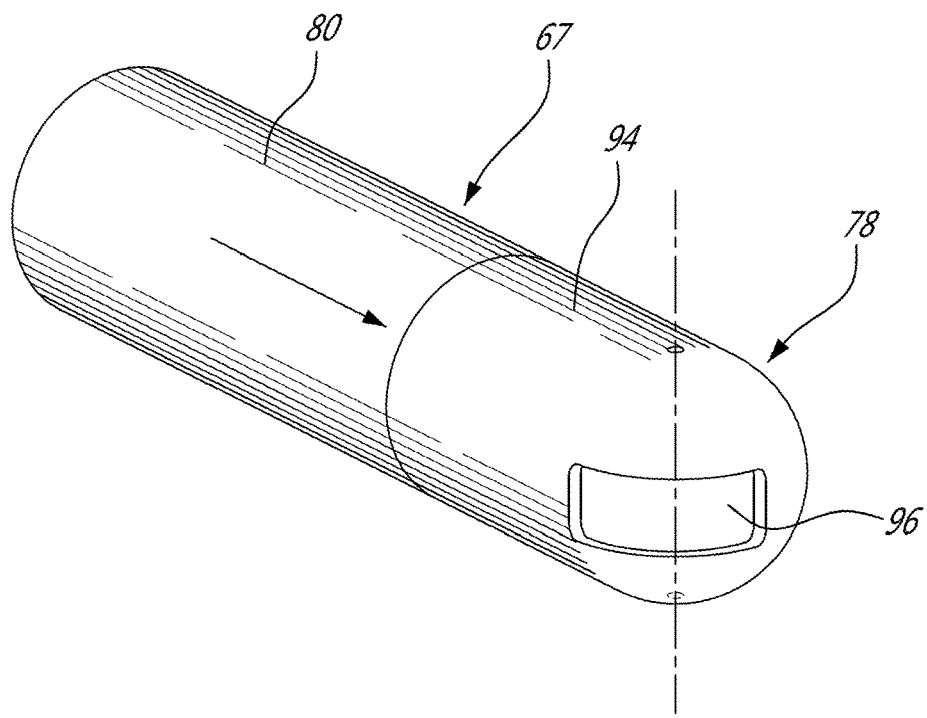
FIG. 6A is a schematic tridimensional view of the end portion of FIG. 4 attached to a duct of the directional control system.
Figure 6B:
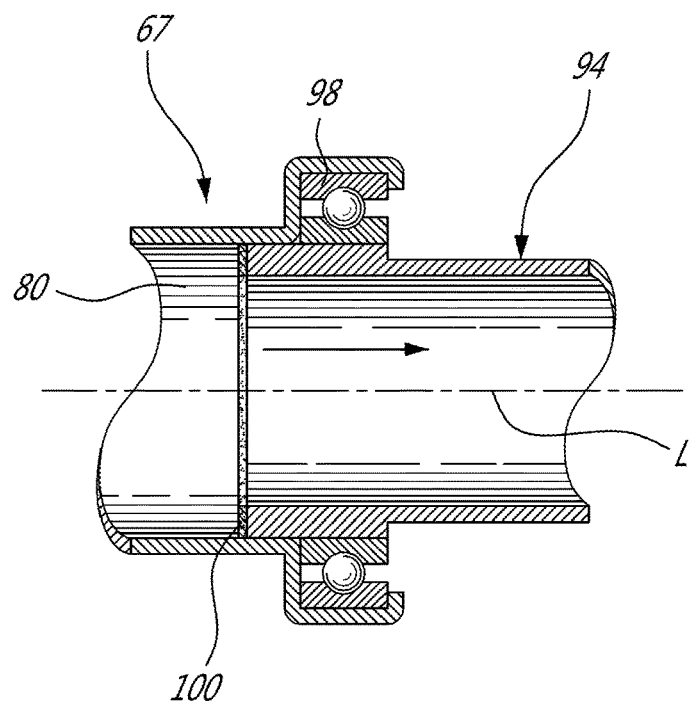
FIG. 6B is a schematic cross-sectional view of part of the assembly of FIG. 6A.

Referring particularly to FIGS. 4, 6A and 6B, the distal end 67 of the tail boom includes an end portion 94 communicating with the duct 80. The end portion 94 has an asymmetric slot 96 defined therethrough. The end portion 94 is shown as being hemispherical, and the slot 96 as extending around an included angle θ (FIG. 4) of about 110 degrees; other configurations are also possible. As shown in FIG. 6B, the end portion 94 is rotationally mounted to the duct 80 such as to be rotatable about a longitudinal axis L, for example by flanges engaged through bearings 98, and the slot 96 is asymmetric with respect to the axis L. Rotation of the end portion 94 about the axis L thus provides a change in the orientation of the slot 96 around the tail boom to direct the jet of the thruster 78. Suitable seals 100 are provided at the connection between the duct 80 and end portion 94.

Figure 5:
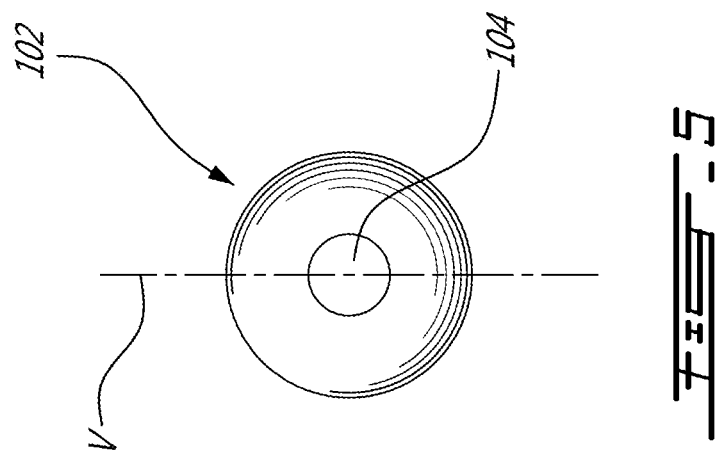
FIG. 5 is a schematic rear view of an inner element configured to be received within the end portion of FIG. 4.

Referring particularly to FIG. 5, an inner element 102 having a shape complementary to that of the end portion 94 (hemispherical in the embodiment shown) is received within the end portion 94 (see FIGS. 7A-7C) with a close fit, and with suitable seals therebetween (not shown). The inner element 102 has a hole 104 defined therethrough cooperating with the slot 96 of the end portion 84 to define the opening of the thruster 78 and direct the reaction jet expelled therethrough. The inner element 102 is pivotable within the end portion 94; in the embodiment shown, it is pivotable about a vertical axis V perpendicular to the longitudinal axis, and is rotatable about an angle of 90 degrees. At its extreme side position (see FIG. 7A), the hole 104 in the inner element 102 is partially covered by the edge of the slot 96 in the end portion 94, thus reducing the opening of the thruster 78 and allowing for modulation of the expelled flow.

Figure 7C:
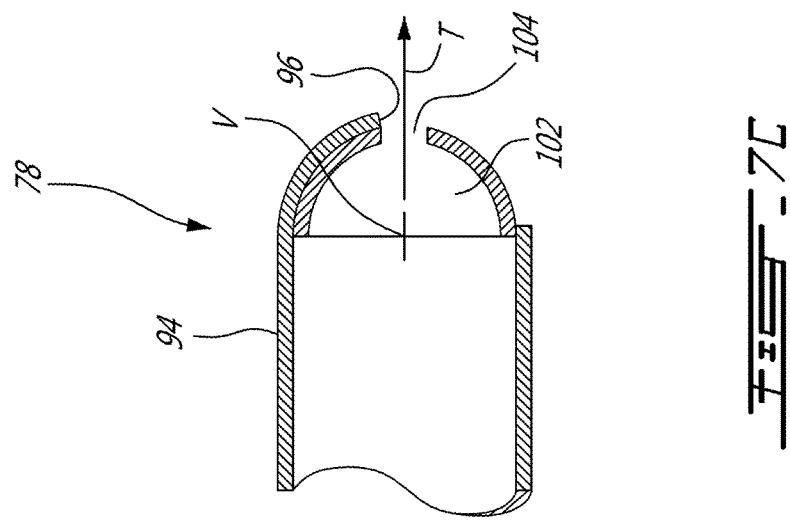
FIGS. 7A, 7B and 7C are schematic cross-sectional top views showing different relative positions of the inner element of FIG. 5 received in the end portion of FIG. 4.
Figure 7B:
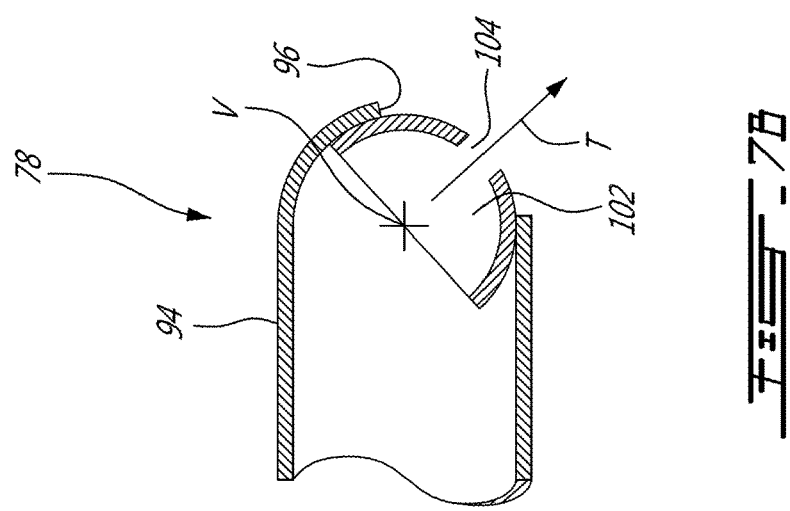
Figure 7A:
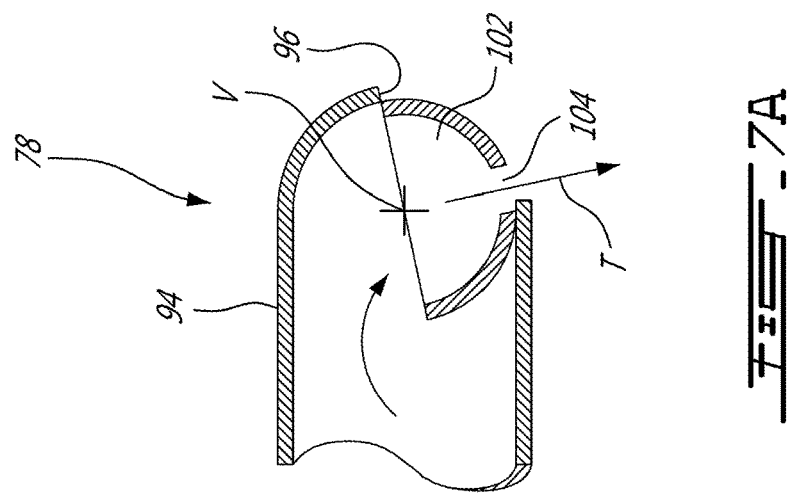

FIG. 7A shows the inner element 102 positioned to provide a thrust T directed toward the side and with the open area of the hole 104 being reduced by the interaction with the end portion 94 to modulate the flow. FIG. 7B shows a position providing a thrust T resulting in combined propulsion and side thrust. FIG. 7C shows a position providing a thrust T resulting in only propulsion. In forward flight, the inner element 102 may thus be moved progressively from the position shown in FIG. 7A towards the axial direction, to provide a forward thrust vector (FIG. 7C) or combined forward and side vector (FIG. 7B).

The variation in position of the inner element 102 may be combined with the rotation of the end portion 94 with respect to the remainder of the tail boom 68 to obtain a wide range of possible orientations for the jet of the thruster 78.

In use, and in a particular embodiment, the directional control of the rotorcraft 8 is thus provided by cooling a component of the rotorcraft 8, such as the engine core 12, with a cooling fluid (e.g. liquid coolant), circulating the cooling fluid from the component through the heat exchanger 28 in heat exchange relationship with a cooling airflow, and using the cooling airflow from the heat exchanger 28 for the directional control. A flow of air is thus created from the environment of the rotorcraft 8 into the tail boom 68, with at least part of the air circulating in heat exchange relationship with the cooling fluid before reaching the tail boom 68. The cooling airflow from the heat exchanger 28 is circulated through and out of the tail boom 68. A boundary layer flow is created along the outer surface of the tail boom 68 with the cooling airflow. The boundary layer directs the downwash from the main rotor 64 around the tail boom 68 to produce a moment opposite the main rotor torque to provide the directional control. In addition or alternately, the cooling airflow may also be expelled out of the tail boom 68 through the thruster 78, and the thruster 78 is orientated to create a yaw moment on the rotorcraft 8 with the discharged air for further directional control. The flow out of the thruster 78 may be modulated as required.

In the embodiments shown, the liquid coolant is circulated through the housing 32 of the internal combustion engine(s) (e.g. rotary engine(s)) of the engine assembly 10. It is however understood that the heat exchanger 28 could be used to cool other components of the engine assembly 10 and/or of the rotorcraft 8, including, but not limited to, supercool bearings in an electric motor, electrical components, batteries, etc., in combination or in replacement of the engine core 12 of the engine assembly 10. Accordingly, the directional control system 70 could use the cooling airflow of any other type of heat exchanger, including, but not limited to, any type of heat exchanger used to cool liquid coolant.

It is understood that the airflow generated by the fan 82 in duct 80 may additionally be used for other purposes. For example, in cases where the airflow is sufficiently heated in the heat exchanger 28, part of the airflow can be extracted from the duct 80 for anti-icing purposes.

In a particular embodiment, combining the flow of the heat exchanger 28 with that of the directional control system 70 allows for a weight reduction, due to elimination of some duplication of parts (e.g. fan 82).

The heat rejected by the heat exchanger 28 and circulated to the directional control system 70 adds energy to the flow of the directional control system 70, which in a particular embodiment provides more thrust capability for the directional control system 70 through increase of the available kinetic energy. Combining the flow of the heat exchanger 28 with that of the directional control system 70 thus allows for increased efficiency of the directional control system 70. Such increased in efficiency may be greater in particular embodiments where the engine core 12 includes one or more intermittent combustion internal combustion engine(s) (e.g. rotary or reciprocating engine(s)), since the rejected heat through liquid coolant is significantly higher than that of a gas turbine engine with equivalent power.

The above description is meant to be exemplary only, and one skilled in the art will recognize that changes may be made to the embodiments described without departing from the scope of the invention disclosed. Modifications other than those explicitly mentioned herein which fall within the scope of the present invention will be apparent to those skilled in the art, in light of a review of this disclosure, and such modifications are intended to fall within the appended claims.

The invention claimed is:

1. A directional control system for a rotorcraft having an internal combustion engine, a main rotor and a tail boom, the directional control system comprising:
    a no-tail-rotor apparatus configured to control rotorcraft yaw using forced air ejected from the tail boom;
    a duct configured to deliver the forced air to the no-tail-rotor apparatus;
    a heat exchanger in heat exchange relationship with an internal combustion engine, the heat exchanger having air passages and fluid passages, the air passages in fluid communication with the duct, the fluid passages in heat exchange relationship with the air passages and configured for receiving a cooling fluid of the internal combustion engine; and
    a forced air driver in fluid communication with the duct and the air passages of the heat exchanger for driving the forced air, including engine cooler exhaust air from the air passages, through the duct to the no-tail-rotor apparatus.

2. The system of claim 1, wherein the no-tail-rotor apparatus includes:
    at least one nozzle in fluid communication with the duct, having a linear configuration and extending longitudinally along an outer surface of the tail boom; and
    a thruster on the tail boom and in fluid communication with the duct, the thruster positionable to be directed laterally with respect to the tail boom in a selected one of a plurality of different orientations.

3. The system as defined in claim 1, further comprising an exhaust conduit communicating with the duct downstream of the heat exchanger and upstream of the no-tail-rotor apparatus, and a valve modulating the communication between the exhaust conduit and the duct.

4. The system as defined in claim 2, wherein a distal end of the tail boom includes an end portion with a slot defined therein, and an inner element having a shape complementary to that of the end portion is received within the end portion, the inner element being pivotable within the end portion and having a hole defined therethrough cooperating with the slot of the end portion to define the thruster.

5. The system as defined in claim 1, wherein the heat exchanger is received within the duct.

6. The system as defined in claim 1, further comprising a bypass passage having one end communicating with the duct upstream of the heat exchanger and an opposed end communicating with the duct downstream of the heat exchanger.

7. The system as defined in claim 1, wherein the fluid passages of the heat exchanger are configured to receive a liquid coolant.

8. An assembly comprising an engine core, the internal combustion engine forming part of the engine core and including at least one rotary internal combustion engine and the system as defined in claim 1, each rotary internal combustion engine having a housing including cooling passages in fluid communication with the fluid passages of the heat exchanger.

9. The assembly as defined in claim 8, wherein the forced air driver is a fan in driving engagement with the at least one rotary internal combustion engine.

10. A method of providing directional control in a rotorcraft having a main rotor and a tail boom, the method comprising:
    cooling a component of the rotorcraft with a liquid coolant;
    cooling the liquid coolant from the component in a heat exchanger by circulating a cooling airflow through the heat exchanger in heat exchange relationship with the liquid coolant; and
    circulating the cooling airflow from the heat exchanger through the tail boom and out of the tail boom, including creating a boundary layer flow along an outer surface of the tail boom with the cooling airflow, and directing a downwash from the main rotor around the tail boom with the boundary layer flow to produce a thrust opposite a torque from the main rotor.

11. The method as defined in claim 10, wherein cooling the component of the rotorcraft with the liquid coolant includes circulating the liquid coolant through a housing of an internal combustion engine of an engine assembly of the rotorcraft.

12. The method as defined in claim 11, wherein circulating the cooling airflow is performed by driving rotation of a fan with the engine assembly.

13. The method as defined in claim 10, wherein circulating the cooling airflow out of the tail boom includes circulating the cooling airflow through two elongated slots extending along a length of the tail boom.

14. The method as defined in claim 10, wherein the boundary layer is created from a first part of the cooling airflow, the method further comprising expelling a second part of the cooling airflow out of the tail boom through a thruster, including orientating the thruster to create a yaw moment on the rotorcraft.

15. The method as defined in claim 14, further comprising modulating a flow of the cooling air out of the thruster.

16. A method of providing directional control in a rotorcraft having a main rotor and a tail boom, the method comprising:
creating a flow of air from an environment of the rotorcraft into the tail boom, at least part of the air circulating in heat exchange relationship with a cooling fluid of the rotorcraft before reaching the tail boom, the air picking up heat from the cooling fluid; and
circulating air out of the tail boom through a thruster positionable to discharge the air along a selected one of opposed sides of the tail boom, including orienting the thruster to create a predetermined yaw moment on the rotorcraft with the air discharged therefrom.

17. The method as defined in claim 16, further comprising circulating the cooling fluid through a housing of an internal combustion engine of an engine assembly of the rotorcraft.

18. The method as defined in claim 17, wherein creating the flow is performed by driving rotation of a fan with the engine assembly.

19. The method as defined in claim 16, wherein circulating the cooling airflow out of the tail boom includes circulating the cooling airflow through at least one nozzle extending longitudinally along the tail boom to direct a downwash from the main rotor around the tail boom to create a thrust opposite a torque effect of the main rotor.

20. The method as defined in claim 16, further comprising modulating a flow of the air out of the thruster.

* * * * *